United States Patent [19]

Fujisaka et al.

[11] Patent Number: 4,918,296
[45] Date of Patent: Apr. 17, 1990

[54] ARTICLE IDENTIFYING SYSTEM

[75] Inventors: Hisato Fujisaka; Koichi Tsujino, both of Kyoto; Tunetaka Shimada, Takatsuki, all of Japan

[73] Assignee: Omron Tateisi Electronics Company, Hanazono, Japan

[21] Appl. No.: 162,416

[22] Filed: Mar. 1, 1988

[30] Foreign Application Priority Data

Mar. 6, 1987 [JP] Japan .................................. 62-52691
Mar. 6, 1987 [JP] Japan .................................. 62-52692

[51] Int. Cl.$^4$ ............................................. G06K 5/00
[52] U.S. Cl. ..................................... 235/380; 235/375; 235/439
[58] Field of Search ....................... 235/375, 380, 439; 340/825, 5 Y

[56] References Cited

U.S. PATENT DOCUMENTS 4,249,663 12/1980 Solbodin .............................. 235/380
4,473,825 9/1984 Walton ................................. 235/380
4,546,241 10/1985 Walton ................................. 235/380

FOREIGN PATENT DOCUMENTS 0204542 12/1986 European Pat. Off. .
3427581 2/1986 Fed. Rep. of Germany .
WO 86/04171 7/1986 World Int. Prop. O. .

Primary Examiner—Harold I. Pitts
Attorney, Agent, or Firm—Foley & Lardner, Schwartz, Jeffery, Schwaab, Mack, Blumenthal & Evans

[57] ABSTRACT

An article identifying system comprises an ID device attached to an article to be identified and a write/read control apparatus to write and read data into and from the ID device. The control apparatus has an oscillator. The ID device has a resonance circuit. Data transmission is performed by the electromagnetic coupling of the oscillator and resonance circuit. The FSK modulation/demodulation are used in this data transmission. Preferably data is encoded by bi-phase code, f/2f code, bipolar code, or dicode code. An electric power can be also supplied from the control apparatus to the ID device by the continuous oscillation of the oscillator.

14 Claims, 16 Drawing Sheets

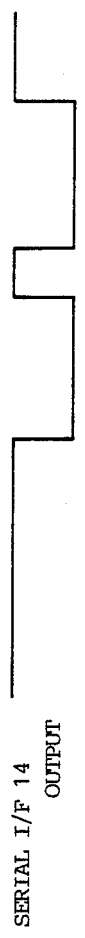
Fig.8a  SERIAL I/F 14 OUTPUT
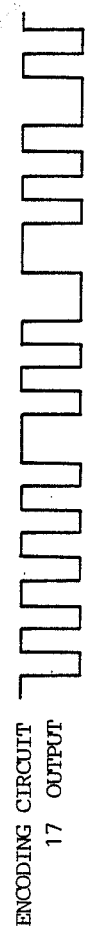
Fig.8b  ENCODING CIRCUIT 17 OUTPUT
Fig.8c  LC OSCILLATOR 18 OUTPUT
Fig.8d  LC RESONANCE CIRCUIT 31 OUTPUT
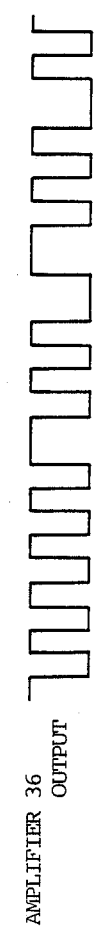
Fig.8e  AMPLIFIER 36 OUTPUT
Fig.8f  DECODING CIRCUIT 37 OUTPUT

Fig.10a MEMORY CONTROL SECTION 38 OUTPUT
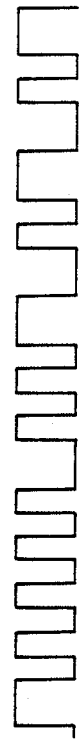
Fig.10b ENCODING CIRCUIT 41 OUTPUT
Fig.10c LC OSCILLATOR 18 OUTPUT
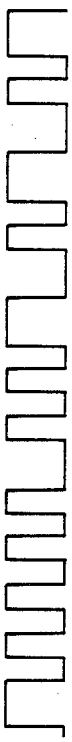
Fig.10d PLL CIRCUIT 20 OUTPUT
Fig.10e DECODING CIRCUIT 23 OUTPUT

4,918,296

ARTICLE IDENTIFYING SYSTEM

BACKGROUND OF THE INVENTION

1. Field of the Invention

The present invention relates to an article identifying system which is used to manage tools of a machine tool, or parts or products in a factory or to identify articles in a distribution or delivery system or the like.

2. Description of the Prior Art

Hitherto, in order to automate the management of tools of a machine tool, identification of parts or products in assembly and transport lines in a factory, or the like, it is necessary to use a system to identify and manage various kinds of articles such as tools, parts, products, and the like. As such a conventional managing system, there has been known a system in which labels having bar codes or the like are adhered to objects to be detected, thereby identifying and managing the objects, or a system in which a group of magnets representing data by a binary value is attached to an object to be identified and the polarities of predetermined magnets are inverted from the outside, thereby giving data. However, these systems have problems such that it is troublesome to rewrite data, the reliability of data is low, and an amount of information which can be held is little.

To eliminate these problems, there has been also proposed an article identifying system in which a memory is provided for an object to be identified, necessary information is previously stored in the memory by the data transmission of a contact type or base band type, and this information is read out as necessary.

However, such a conventional identifying system has drawbacks such that a backup battery is needed to keep the data in the memory, it is troublesome for management, and shock resistance and vibration resistance are low.

Although a contact type system or a contactless type system is considered as a data transmission system, the contact type system has problems such that the positioning needs to be accurately performed, defective contacts easily occur in the contact portions, and data cannot be certainly written.

On the other hand, the contactless type system includes a conventional base band system in which electromagnetic waves or the like are intermitted on the basis of a digital signal to be transmitted, thereby giving the transmission signal and electric power to a memory unit which is attached to an article. However, this system has a problem such that the reliability is low. In addition, according to the data transmission by the base band system, there are also drawbacks such that a supplying efficiency of an electric power to the memory is low and the memory itself needs a power source because the frequency is low and the electromagnetic waves are intermitted. Further, there is also a problem such that when metal material or the like approaches this system, the output level of a receiving circuit of electromagnetic waves fluctuates and the reliability of data is low.

SUMMARY OF THE INVENTION

It is an object of the present invention to provide an article identifying system of the contactless type having a high reliability.

Another object of the invention is to make it unnecessary to use a power source of a unit which is attached to an article.

Still another object of the invention is to improve the reliability of data transmission even if metal material or the like approached when signals are transmitted.

According to the present invention, there is provided an article identifying system having an ID device which is attachable to an article to be identified and a write/read control apparatus to write or read data into or from the ID device. The ID device comprises a resonance circuit including a coil; first data demodulating means for demodulating an output signal of the resonance circuit and obtaining data represented by a change in frequency of the demodulated output signal; an electrically erasable and programmable memory for storing identification data of the article to which the ID device is to be attached; memory control means for controlling a writing operation of the demodulated data into and reading operation of data from the memory; data modulating means for changing a resonant frequency of the resonance circuit on the basis of the transmission data which is read out of the memory; and a rectifying/smoothing circuit for rectifying and smoothing an output from the resonance circuit, thereby supplying a DC power source to each section of the ID device. The write/read control apparatus has an oscillator which includes an oscillating coil and discontinuously changes an oscillating frequency in accordance with a data signal to be transmitted to the ID device; second data demodulating means for demodulating a data signal which is given by the ID device on the basis of a frequency change of a signal obtained from the oscillator; and data processing means for giving serial data to be transmitted to the oscillator and for converting data given from the second data demodulating means into a parallel signal.

According to the invention having such a feature, the ID device including the resonance circuit and memory is attached to an article to be identified. The oscillator in the write/read control apparatus always continues the oscillation. When the ID device has reached a predetermined position, a high frequency signal obtained in the resonance circuit is rectified and smoothed, so that a DC power source is stably supplied to the ID device. The necessary data is transmitted to the ID device by FSK modulation, i.e. by discontinuously changing the oscillating frequency of the oscillator of the write/read control apparatus. The ID device identifies the data by receiving and demodulating the signal and writes the necessary data into the memory, or reads out the necessary data from a predetermined address in the memory and changes the resonant frequency of the resonance circuit based on the read data. Due to this, on the write/read control apparatus, a load of the oscillator differs in association with a change in resonant frequency. Therefore, the data can be received on the basis of the load fluctuation, and this data is demodulated to thereby reproduce the readout data.

As described above, according to the invention, an electric power is supplied to the ID device by using the electromagnetic coupling and an FSK system is used in place of the base band system. Therefore, the oscillation is always continued and a high frequency signal can be also used. A DC power source can be stably supplied to the ID device. On the other hand, the half duplex data transmission can be performed between the ID device and the write/read control apparatus in a contactless manner.

If an electrically erasable programmable non-volatile memory is used as a memory of the ID device, when the ID device is away from the write/read control apparatus, although no power source is supplied to the ID device, the content of the data is held as it is in the memory. When the ID device approaches the write/read control apparatus, the data transmission can be performed.

Further, since the data transmission is executed by using the FSK system having a low transmission error rate, the reliability of the signal can be improved.

Further, according to the present invention, the ID device further comprises first encoding means for encoding the data read out of the memory by the memory control means into transmission code having no DC component and for giving the code to the data modulating means, and first decoding means for decoding the encoded data signal having no DC component which was demodulated by the first data demodulating means. The write/read control apparatus further comprises second encoding means for encoding the data to be transmitted to the ID device into transmission code having no DC component and for giving the code to the oscillator, and second decoding means for decoding the encoded data signal having no DC component which was demodulated by the second data demodulating means.

Namely, the write/read control apparatus encodes the data to be transmitted by the transmission code having no DC component and discontinuously changes the oscillating frequency of the oscillator on the basis of the transmission code, thereby transmitting the necessary data to the ID device by the FSK modulation. The ID device receives and decodes this data, thereby discriminating the signal. Then, the ID device writes the necessary data into the memory. The ID device reads out the necessary data from a predetermined address in the memory and encodes this data into transmission code having no DC component and changes the resonant frequency of the resonence circuit based on the transmission code. In this way, the data is transmitted to the write/read control apparatus.

The transmission code having no DC component represents bi-phase code, f/2f code, bipolar code, dicode code, or the like and denotes a code in which the level, frequency, phase, or the like of the signal is changed every bit of data.

Since data is encoded by the transmission code having no DC component, even if metal material or the like approaches the ID device upon data transmission and the resonant frequency of the resonance circuit changes, so that the level of the DC component of the demodulated signal fluctuates, the encoded data can be accurately discriminated by detecting a change by the encoding of the signal. Only the change amount can be also amplified by an AC amplifier. The reliability of the data transmission is improved.

BRIEF DESCRIPTION OF THE DRAWINGS

FIGS. 8a and 8f are waveform diagrams showing waveforms in respective sections in the case of transmitting data from the write/read control apparatus to the ID device in the article identifying system;

FIGS. 10a to 10e are waveform diagrams showing waveforms in respective sections in the case of transmitting data from the ID device to the write/read control apparatus;

FIG. 17 is a block diagram showing a constitution of a write/read control apparatus; and FIG. 18 is a block diagram showing a constitution of an ID device.

DETAILED DESCRIPTION OF PREFERRED EMBODIMENTS

Figure 1:
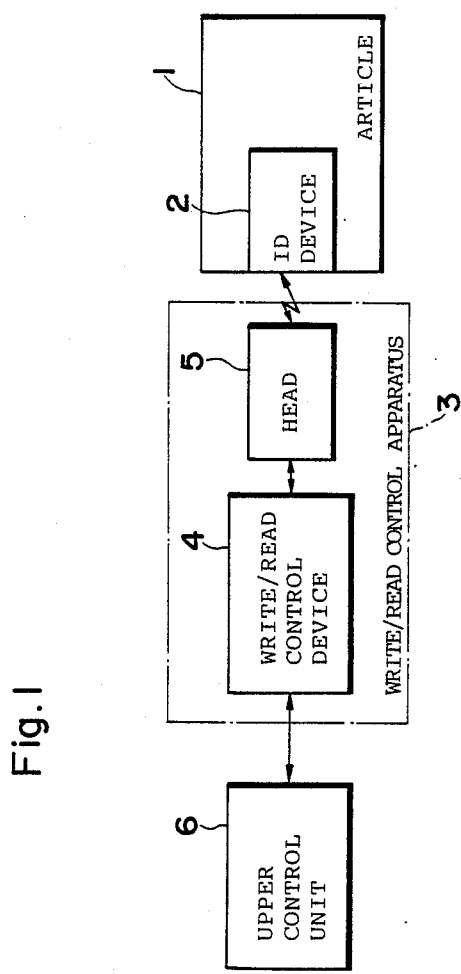
FIG. 1 is a block diagram showing a whole constitution of an article identifying system according to an embodiment of the present invention.

FIG. 1 is a block diagram showing a constitution of an article identifying system according to an embodiment of the present invention. In the diagram, the article identifying system comprises an identifying device (hereinafter, simply referred to as an ID device) 2 and a write/read control apparatus 3 to write or read data into or from the ID device 2. The ID device 2 is directly attached to an article 1 such as tool, part, product, or the like as an object to be identified. The write/read control apparatus 3 comprises a write/read control device 4 and a head 5. When the ID device 2 approaches the write/read control apparatus 3, data is communicated therebetween through the head 5. The write/read control apparatus 3 is further connected to an upper control unit 6. Data is written into or read out from the ID device 2 through the write/read control apparatus 3 by the upper control unit 6.

(1) Constitution of the Write/Read Control Apparatus

Figure 2:
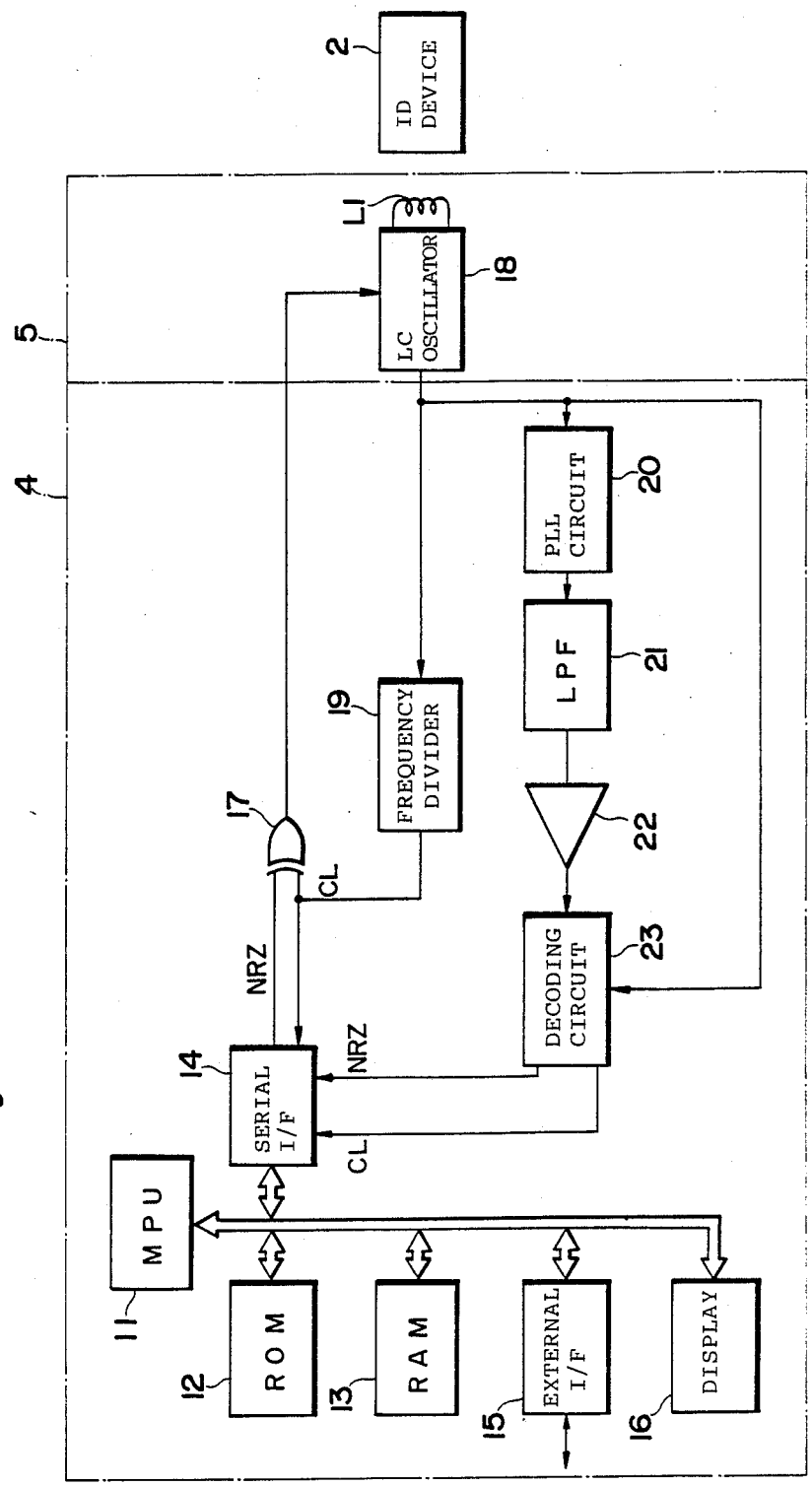
FIG. 2 is a block diagram showing a constitution of a write/read control apparatus in the embodiment.

Referring now to a detailed block diagram of FIG. 2, the control device 4 in the write/read control apparatus 3 comprises: a microprocessor (MPU) 11 to control the writing and reading operations of data into and from the ID device 2; a read only memory (ROM) 12 to store a system program of the MPU 11; a random access memory (RAM) 13 to temporarily store data; a serial interface 14 to perform the serial/parallel conversion and parallel/serial conversion of data in order to execute the serial data transmission with the ID device 2; an external interface 15 to perform the interface with the upper control unit 6; and a display device 16. The MPU 11 transmits data and commands to the ID device 2 through the serial interface 14 in accordance with predetermined processing program. The digital data is sent as a NRZ (non-return-to-zero) serial signal from the serial interface 14 to an encoding circuit 17. The encoding circuit 17 consists of an exclusive OR circuit and converts the NRZ serial signal into the bi-phase signal. An output of the encoding circuit 17 is given as a control signal to an LC oscillator 18 in the head 5. The LC oscillator 18 always continues the oscillation and changes the oscillating frequency in response to the control signal from the encoding circuit 17 and functions as a frequency shift keying (FSK) modulator. The LC oscillator 18 transmits a signal to the ID device 2 through an oscillating coil $L_1$ and gives the oscillating output to a frequency divider 19 and a PLL circuit 20. The frequency divider 19 shapes a waveform of an output of the LC oscillator 18 and frequency divides the waveform shaped output, thereby giving a clock signal to the encoding circuit 17 and serial interface 14.

The PLL circuit 20 consists of a well-known phase locked loop circuit. When a resonance circuit, which will be explained hereinlater, of the ID device 2 approaches the LC oscillator 18 and its load changes, the PLL circuit 20 detects a change in oscillating frequency of the oscillator 18. Due to this, the PLL circuit 20 functions as an FSK demodulator and receives the signal from the ID device 2. An output of the PLL circuit 20 is supplied through a low pass filter (LPF) 21 to an amplifier 22 to amplify the AC component. An output of the amplifier 22 is given to a decoding circuit 23. Since the signal from the ID device 2 has been bi-phase encoded as will be explained hereinlater, the decoding circuit 23 converts the bi-phase code derived from the amplifier 22 into the NRZ serial signal. An output of the decoding circuit 23 and the clock signal obtained at the time of converstion are given to the MPU 11 through the serial interface 14. The MPU 11, ROM 12, RAM 13 and serial interface 14 constitute data processing means for transmitting serial data to be transmitted to the ID device 2 and for receiving and processing the serial data which is obtained from the ID device 2.

Figure 3:
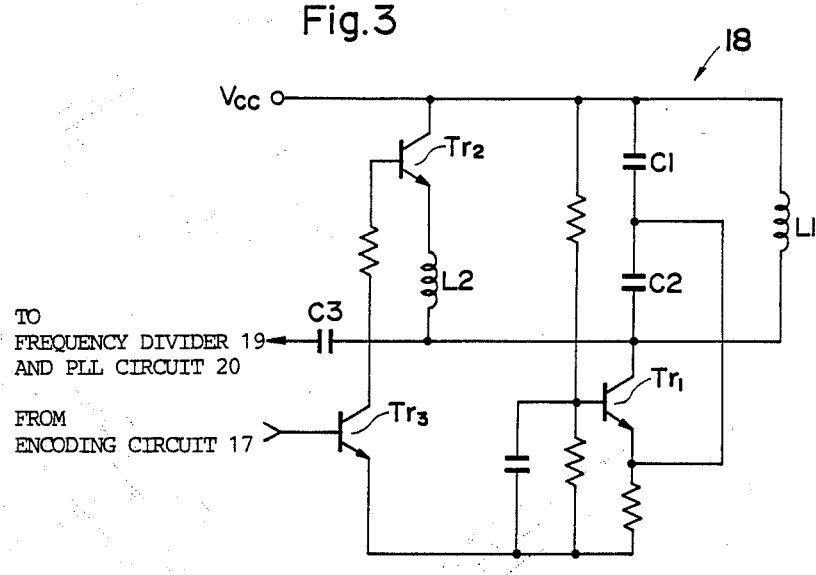
FIG. 3 is a circuit diagram showing a constitution of an LC oscillator in the write/read control apparatus.

FIG. 3 is a circuit diagram showing a detailed constitution of the LC oscillator 18 in the head 5. As shown in the diagram, the LC oscillator 18 is constituted in a manner such that an LC resonance circuit consisting of the oscillating coil $L_1$ and capacitors $C_1$ and $C_2$ is connected to a transistor $Tr_1$ and, further, a transistor $Tr_2$ and a coil $L_2$ are connected in parallel with the LC resonance circuit. A transistor $Tr_3$ which is controlled by the output of the encoding circuit 17 is connected to a base of the transistor $Tr_2$. When the switching transistors $Tr_2$ and $Tr_3$ are turned on, the coil $L_2$ is connected in parallel with the resonance circuit. When the transistors $Tr_2$ and $Tr_3$ are turned off, the coil $L_2$ is disconnected from the resonance circuit. Therefore, the oscillating frequency of the oscillator 18 can be discontinuously changed (FSK modulated). On the other hand, the frequency divider 19 and PLL circuit 20 are connected through a capacitor $C_3$ to the hot end side of the coil $L_2$.

(2) Constitution of the ID Device

Figure 4:
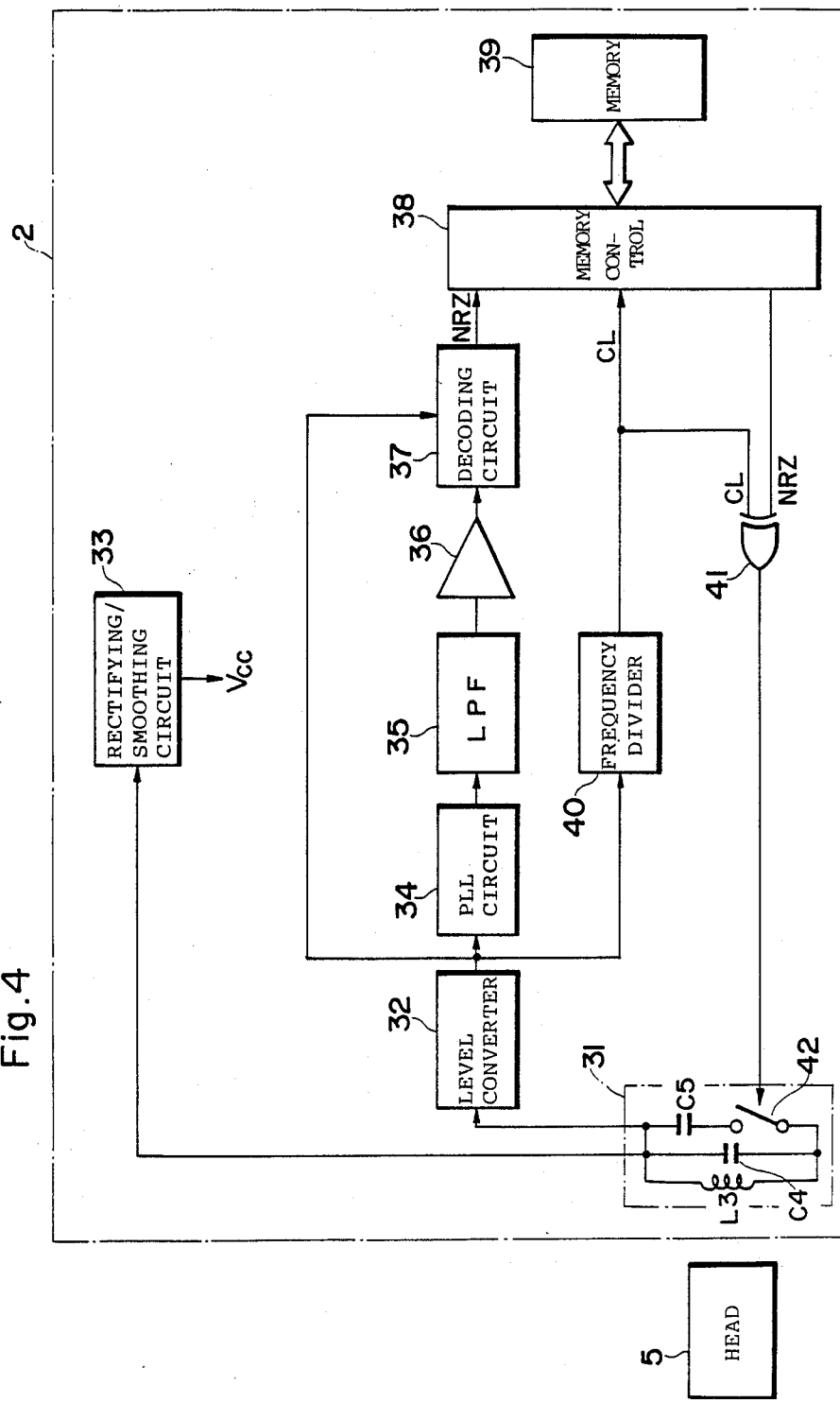
FIG. 4 is a block diagram showing a constitution of an ID device.

As shown in FIG. 4, the ID device 2 has a resonance circuit including a coil, e.g., an LC resonance circuit 31 including, e.g., a coil $L_3$ and a capacitor $C_4$. The LC resonance circuit 31 can change the resonant frequency by intermittently disconnecting a parallel capacitor $C_5$ by a switch (switching device) 42. One end of the resonance circuit 31 is connected to a level converter 32 and a rectifying/smoothing circuit 33. The level converter 32 converts a DC level of a fluctuating high frequency signal obtained from the LC resonance circuit 31 into a desired level. An output of the level converter 32 is given to a PLL circuit 34, a decoding circuit 37 and a frequency divider 40. The PLL circuit 34 functions as a demodulator for demodulating the FSK modulated signal which is given from the level converter 32 and converting into the original serial digital signal (bi-phase encoded signal). An output of the PLL circuit 34 is supplied through a low pass filter 35 to an amplifier 36 to amplify the AC component. An output of the amplifier 36 is given to the decoding circuit 37. The decoding circuit 37 converts the bi-phase encoded digital signal into the original NRZ digital signal. The NRZ digital serial signal is input to a memory control section 38.

A memory 39 consisting of, e.g., an electrically erasable programmable non-volatile read only memory (hereinafter, abbreviated to an EEPROM) is connected to the memory control section 38. The frequency divider 40 frequency divides the high frequency signal which is obtained through the level converter 32 from the LC resonance circuit 31, thereby giving a clock signal to the memory control section 38 and an encoding circuit 41. The memory control section 38 converts the serial digital signal obtained from the decoding circuit 37 into the parallel signal and discriminates a command included in the data. In accordance with this command, the memory control section 38 controls the writing and reading operations of the data into and from the memory 39.

The data read out of the memory control section 38 is given to the encoding circuit 41. The encoding circuit 41 bi-phase encodes the NRZ serial digital signal and consists of an exclusive OR circuit to get the exclusive OR of the clock signal and NRZ signal. An output of the encoding circuit 41 is given as an ON/OFF control signal of the switch 42 to change the resonant frequency of the LC resonance circuit 31.

Figure 5:
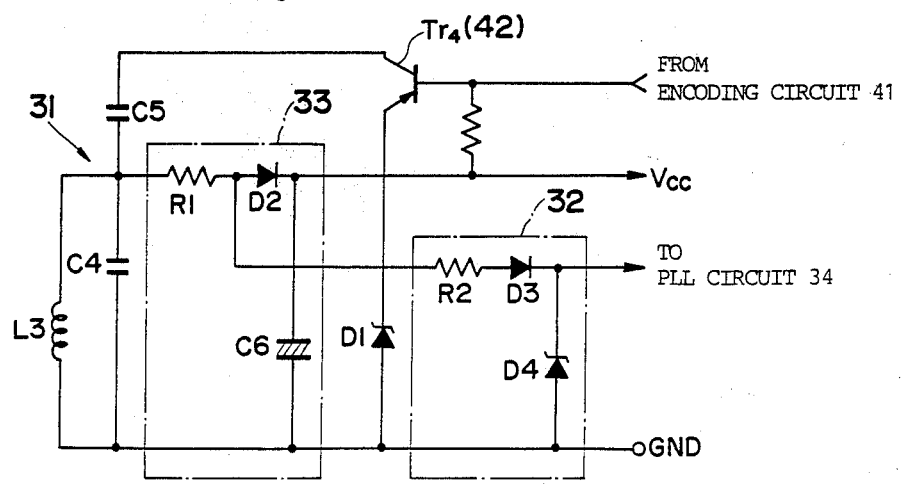
FIG. 5 is a circuit diagram showing constitutions of an LC resonance circuit and a level converter in the ID device.

FIG. 5 is a circuit diagram showing detailed constitutions of the LC resonance circuit 31, level converter 32 and rectifying/smoothing circuit 33 in the ID device 2. As shown in this diagram, the LC resonance circuit 31 is constituted in a manner such that the capacitor $C_5$ is further connected in parallel with the parallel circuit consisting of the coil $L_3$ and capacitor $C_4$ through a switching transistor $Tr_4$ (the switch 42) and a Zener diode $D_1$. The rectifying/smoothing circuit 33 having a resistor $R_1$, a diode $D_2$ and a capacitor $C_6$ is connected to the LC resonance circuit 31. An output of the rectifying/smoothing circuit 33 is supplied as a power source to each section in the ID device 2. On the other hand, the level converter 32 consisting of a resistor $R_2$, a diode $D_3$ and a Zener diode $D_4$ is connected to the resistor $R_1$. The encoding circuit 41 drives the switching transistor $Tr_4$ and discontinuously changes the resonant frequency of the resonance circuit 31 by turning on and off the transistor $Tr_4$ to connect the capacitor $C_5$ in parallel therewith in a high frequency manner. The level converter 32 is a kind of limiter for limiting the voltage appearing in the resonance circuit 31 by cutting off the voltage of the power source voltage $V_{cc}$ or higher and the voltage of 0V or lower. Namely, the level converter 32 limits the voltage to a value within a range from 0 to $V_{cc}$. Thus, the DC level of the signal is also converted by this manner.

(3) Constitution of the Memory Control Section

Figure 6:
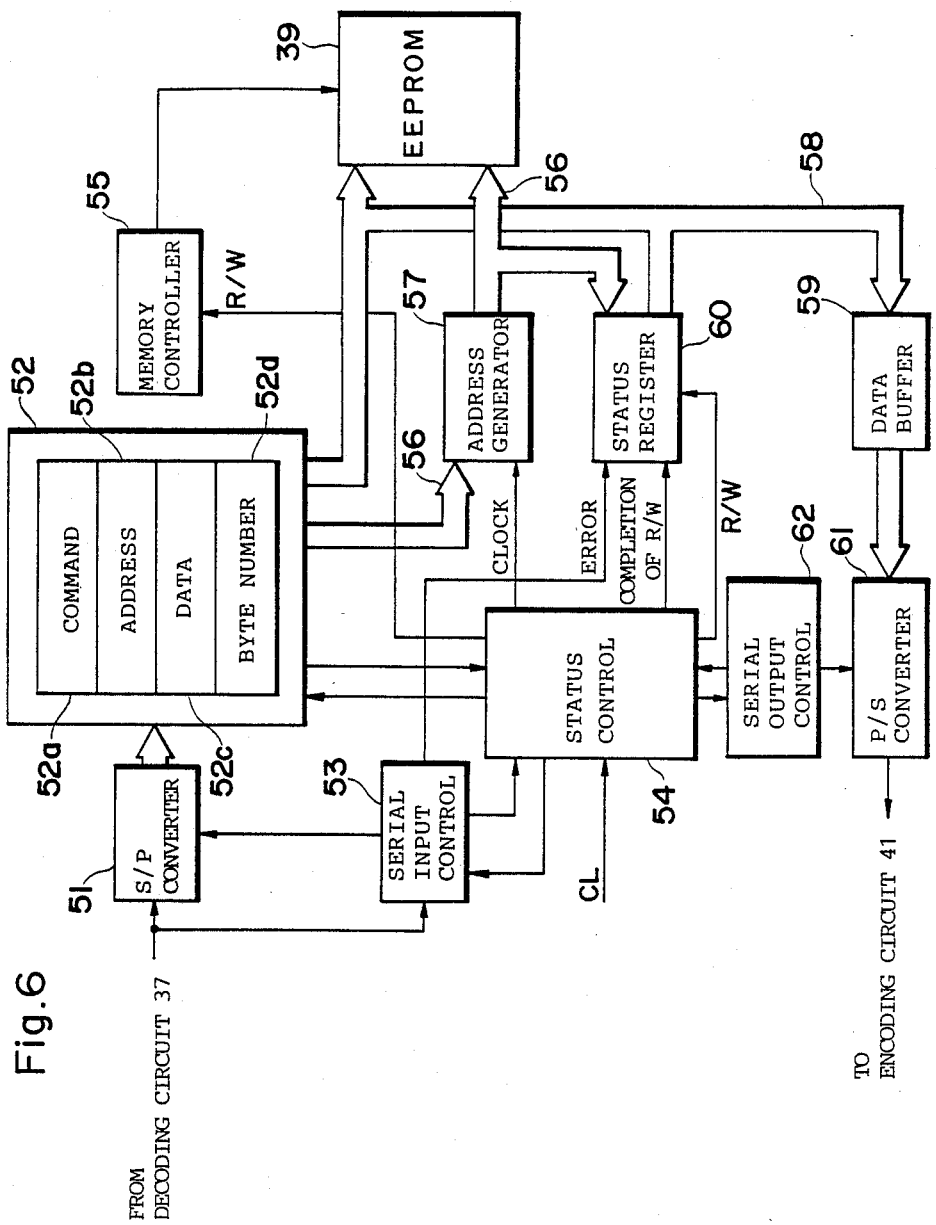
FIG. 6 is a block diagram showing a detailed constitution of a memory control section.

FIG. 6 is a block diagram showing a detailed constitution of the memory control section 38. In this diagram, the memory control section 38 has a serial/parallel (S/P) converter 51 to convert the serial digital signal obtained from the decoding circuit 37 into the parallel signal and a command decoder 52 to decode a command of the parallel signal as an output of the S/P converter 51. A serial input control section 53 is connected to the S/P converter 51. By giving a clock signal to the S/P converter 51 at a predetermined timing, the serial input control section 53 causes the S/P converter 51 to convert the received serial signal into the parallel data at a necessary time point. The command decoder 52 has therein a command register 52a to temporarily hold commands which are given from the write/read control apparatus 3, an address register 52b to temporarily hold addresses, a data register 52c to temporarily hold data, and a byte number counter 52d to hold the number of bytes of the readout data.

A status control section 54 to control the execution of commands is connected to the command decoder 52. An address generator 57 is further connected to the command decoder 52 through an address bus 56. On the basis of the clock signal which is supplied from the frequency divider 40, the status control section 54 controls each block in order to execute the content of the given command data. On the basis of write and read signals of the status control section 54, a memory controller 55 controls the writing and reading operations of data into and from the memory 39. An output of the data register 52c in the command decoder 52 is given to the memory 39 through a data bus 58. A data buffer 59 to temporarily store the data read out of the memory 39 is connected to the data bus 58.

The address generator 57 sequentially generates addresses in response to a stepping signal which is supplied from the status control section 54 on the basis of the address values from the address register 52b in the command decoder 52. The address signals are given to the memory 39 and a status register 60. The status register 60 holds transmission/reception commands, information indicative of the execution of the writing/reading operations, and error information. The status register 60 is arranged in a part of the same address space as the memory 39.

Parallel outputs of a data buffer 59 are connected to a parallel/serial (P/S) converter 61. On the other hand, the status control section 54 is the sequence circuit to advance the control of each section when predetermined conditions are satisfied. When data is output, the status control section 54 gives an output start signal to a serial output control section 62. The serial output control section 62 gives a clock signal corresponding to the timing for transmitting a data signal to the P/S converter 61 and also adds a start bit and stop bit to the transmission data. When data is read out, the P/S converter 61 converts the data which is held in the data buffer 59 into the serial signal and adds a parity bit and a start bit and stop bit to this serial signal and then gives the resultant signal to the encoding circuit 41.

(4) Constitution of the Decoding Circuit

Figure 7:
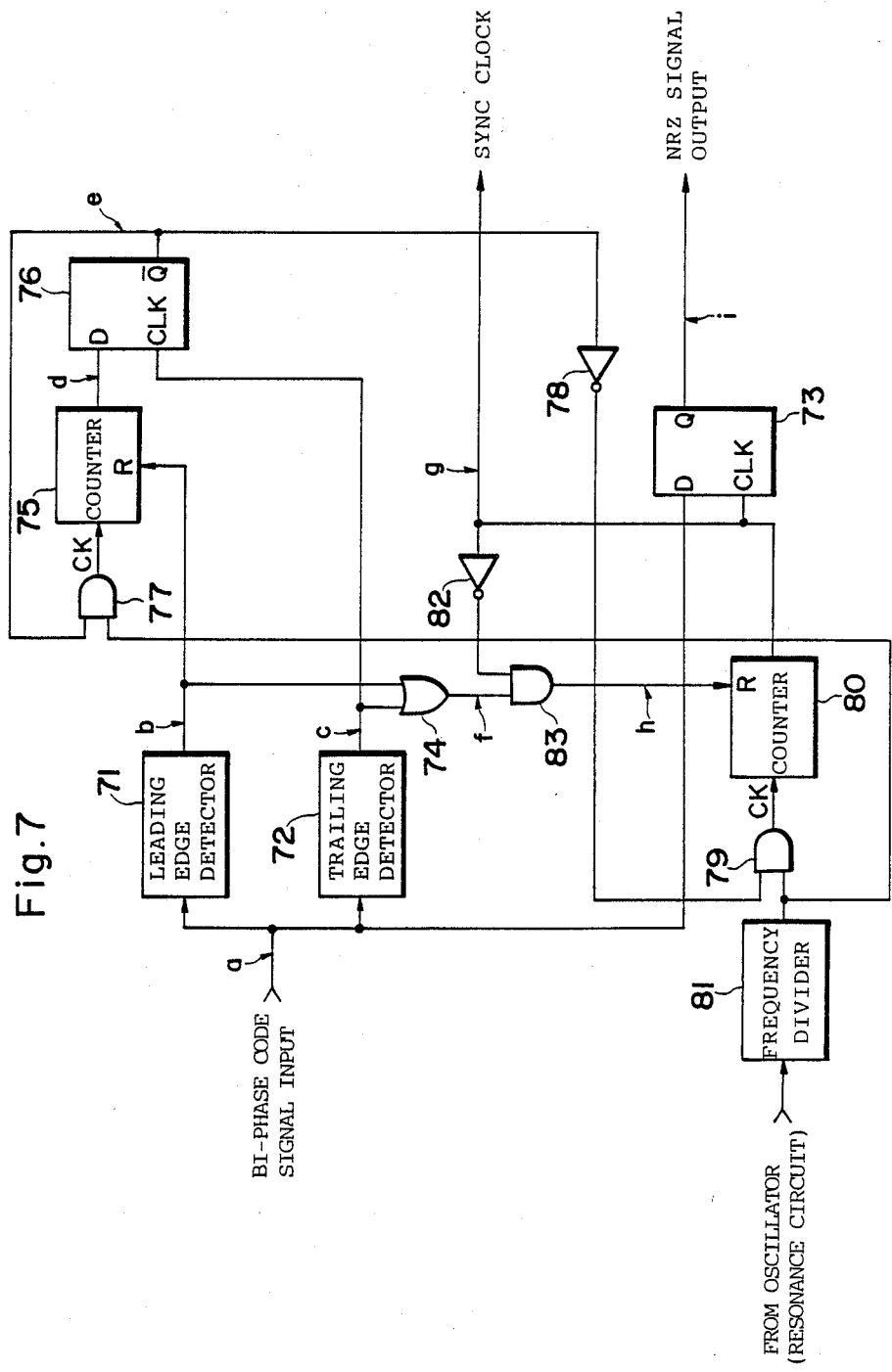
FIG. 7 is a block diagram showing an example of a decoding circuit in the embodiment.

Constitutions of the decoding circuits 23 and 37 will be further described in detail. The decoding circuits 23 and 37 can be constituted in substantially the same manner. FIG. 7 is a block diagram showing an example of the decoding circuit. The decoding circuit of this example is all realized by digital elements without using analog elements. An output from the amplifier 22 or 36 is given to a leading edge detector 71, a trailing edge detector 72 and a D-type flip-flop 73. The detector 71 detects the leading edge of an input signal. The detector 72 detects the trailing edge of an input signal. Outputs of both detectors are given to an OR circuit 74. The output of the detector 71 is supplied to a reset input terminal of a counter 75. The output of the detector 72 is supplied to a clock input terminal of a D-type flip-flop 76. The counter 75 counts a predetermined number of, e.g., eighteen input signal pulses. A count output of the counter 75 is fed to the D-type flip-flop 76. A $\bar{Q}$ output of the flip flop 76 is supplied to the counter 75 through an AND circuit 77, and to a counter 80 through an inverter 78 and an AND circuit 79.

On the other hand, a high frequency signal which is obtained directly from the LC oscillator 18 or obtained through the level converter 32 from the resonance circuit 31 is frequency divided by a frequency divider 81. The frequency divided output is given to the counters 75 and 80 through AND circuits 77 and 79, respectively. The frequency divider 81 frequency divides the output from the oscillator 18 or resonance circuit 31 and generates a number of clocks which are slightly larger than twenty-four clocks with respect to one clock of the bi-phase code. On the basis of this input signal, the counter 80 obtains a sync clock signal of the bi-phase code. An output of the counter 80 is supplied to a clock input terminal of the flip-flop 73 and is also returned to a reset input terminal of the counter 80 through an inverter 82 and AND circuit 83. The flip-flop 73 converts the bi-phase code to the NRZ code in response to this sync clock signal. The NRZ code and sync clock signal are given to the serial interface 14 or memory control section 38.

(5) Description of the Operation

The operation of the embodiment will now be described with reference to waveform diagrams. FIGS. 8a to 8f, 9, and 10a to 10e are waveform diagrams showing waveforms in respective sections in this embodiment. First, when the ID device 2 attached to the article 1 as an object to be identified approaches the head 5 in the write/read control apparatus 3, a high frequency signal is transmitted from the coil $L_1$ of the LC oscillator 18 in the apparatus 3 to the LC resonance circuit 31 in the ID device 2. Since the LC oscillator 18 continuously oscillates without being interrupted, the high frequency signal obtained in the LC resonance circuit 31 is converted into the DC voltage by the rectifying/smoothing circuit 33 and a power source is supplied to each block of the ID device 2. Thus, the ID device 2 starts the operation and the data transmission between the ID device 2 and the write/read control apparatus 3 can be performed.

In the case of writing data into the ID device 2 by the write/read control apparatus 3, a write command and write data are given from the MPU 11 to the serial interface 14. As shown in FIG. 8a, the serial interface 14 converts the signal from the MPU 11 into the serial signal and sends to the encoding circuit 17. The clock signal obtained by frequency dividing the oscillating output which is generated from the LC oscillator 18 is given to the encoding circuit 17. As shown in FIG. 8b, the encoding circuit 17 converts the NRZ signal into the bi-phase code. Therefore, the bi-phase code is given as a control signal to the LC oscillator 18. As shown in FIG. 8c, the oscillating frequency of the LC oscillator 18 intermittently changes and the FSK modulation is performed. Since the FSK modulated output is supplied to the LC resonance circuit 31 in the ID device 2, the same signal (FIG. 8d) is derived from the resonance circuit 31. This output signal is transferred to the PLL circuit 34 through the level converter 32 and demodulated. As shown in FIG. 8e, the signal from which the high frequency component was eliminated by the low pass filter 35 is amplified by the amplifier 36. Since the amplifier 36 is the AC amplifier and the DC component is eliminated, only the change amount is given to the decoding circuit 37. Since the decoding circuit 37 extracts clocks from this signal and decodes, as shown in FIG. 8f, the NRZ signal similar to that of FIG. 8a can be reconstructed. This signal is supplied as a serial signal to the memory control section 38.

When metal material or the like approaches the write/read control apparatus 3 and ID device 2, the resonant frequency of the resonance circuit 31 changes, so that there is a case where a DC level of the output of the PLL circuit 34 fluctuates. However, in this embodiment, since the NRZ signal is bi-phase encoded and then transmitted, no problem occurs in such a case. Namely, as shown in FIG. 8a, the NRZ signal is held at the L level when data 0 indicated by this signal continues. On the contrary, the NRZ signal is held at the H level when data 1 continues. Therefore, so long as a reference level (0 level) is not determined (in other words, when the DC level fluctuates), it is impossible to decide whether data is 0 or 1. On the other hand, the bi-phase signal changes from the H level to the L level when data is 0, while the bi-phase signal changes from the L level to the H level when data is 1. Since the level of the bi-phase signal changes every bit of data, even if the average value level varies, it is possible to determine whether the data is 1 or 0 on the basis of this level change.

Figure 9:
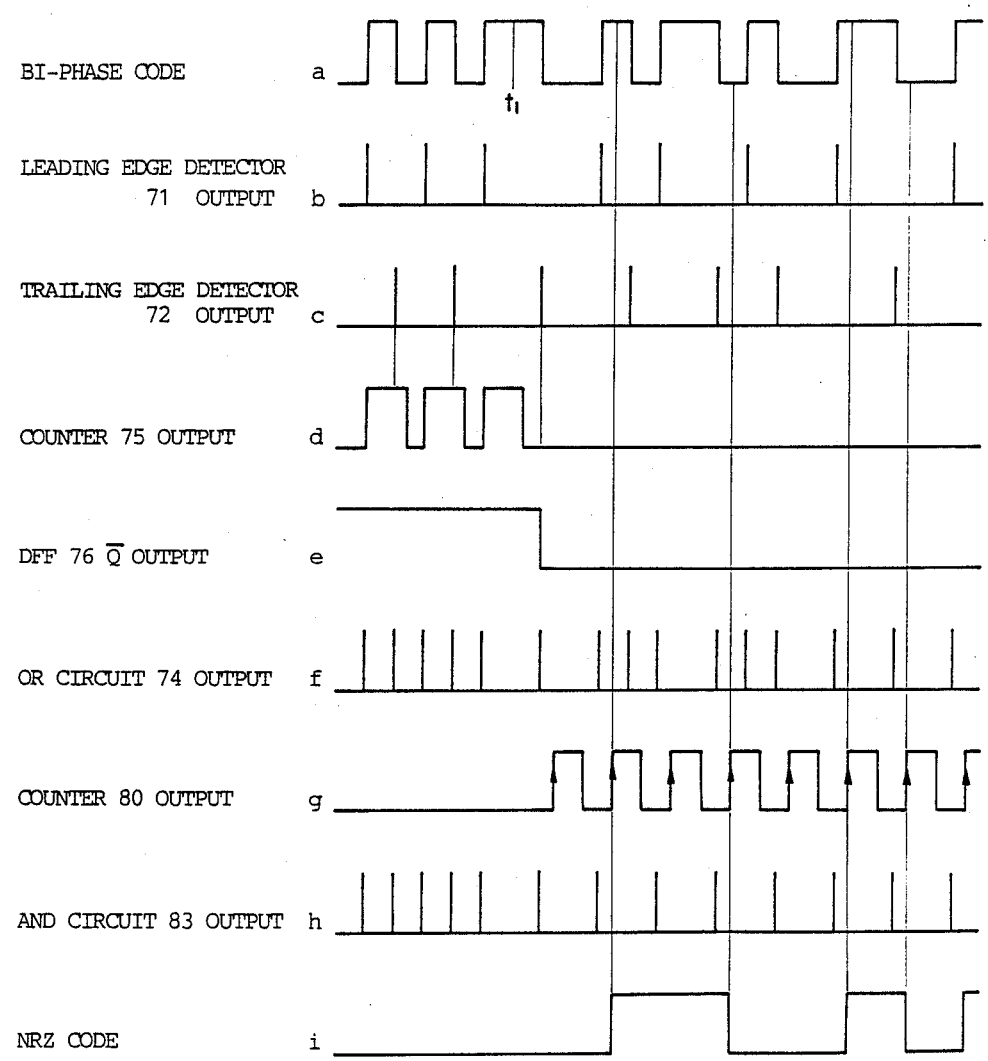
FIG. 9 is a waveform diagram showing waveforms in respective sections in the decoding circuit.

FIG. 9 is a waveform diagram showing the operations of the decoding circuits 23 and 37. Reference symbols a to i in FIG. 7 correspond to waveforms a to i in FIG. 9. A signal a in FIG. 9 indicates a bi-phase code which is given to the decoding circuit 23 and 37. Subsequent to the start signal "11 . . . 1", desired data is output after time $t_1$. The leading edge detector 71 and trailing edge detector 72 respectively generate outputs b and c as shown in FIG. 9. The output b resets the counter 75. The output c is supplied as a clock input of the flip-flop 76. In this case, since the frequency divider 81 outputs a signal of a period of, e.g., about 1/24 of the bi-phase code, when the start signal is finished, the time difference between the output b of the leading edge detector 71 and the output c of the trailing edge detector 72 is set to a value of a predetermined value or more. Thus, as shown in signals b to e in FIG. 9, the $\overline{Q}$ output e of the flip-flop 76 is set to the L level and the decoding is started. Therefore, since the gate 79 is opened after that, the clock signal is given to the counter 80. By counting the outputs of the frequency divider 81, a sync signal is given. Namely, it is now assumed that the counter 80 outputs a signal which rises and falls when six clocks and eighteen clocks among 24 clocks are counted, respectively, so that as shown in a signal g in FIG. 9, a sync clock can be output from the counter 80. By giving the bi-phase code to the D-type flip-flop 73 and by using this sync clock, the NRZ code can be obtained as shown in a signal i in FIG. 9.

On the other hand, the serial NRZ signal which is read out from the memory 39 by the memory control section 38 and clock signal are supplied to the encoding circuit 41. The encoding circuit 41 converts the NRZ signal as shown in FIG. 10a into the bi-phase code as shown in FIG. 10b. By turning on and off the transistor $Tr_4$ (switch 42) by the bi-phase code signal, the resonant frequency of the LC resonance circuit 31 is changed (i.e., the FSK modulation is performed). Since the change in the resonant frequency appears as a change in load of the LC oscillator 18 in the write/read control apparatus 3, the oscillating frequency of the LC oscillator 18 slightly changes. Therefore, the oscillating frequency of the LC oscillator 18 changes as shown in FIG. 10c. The PLL circuit 20 demodulates this frequency changes and gives its output to the low pass filter 21. The high frequency component is eliminated from this output by the low pass filter 21 and the resultant signal is then amplified. In this case, even if the DC level of the output of the PLL circuit 20 fluctuated due to an influence by metal material, the level change of the bi-phase code signal after demodulation as shown in FIG. 10d is given to the decoding circuit 23 by the AC amplifier 22. In the decoding circuit 23, by extracting clocks from the bi-phase code and decoding, the NRZ signal as shown in FIG. 10e can be derived. This signal is input to the serial interface 14 and converted into the parallel signal. This parallel signal is supplied to the MPU 11. In this manner, the half duplex data transmission can be performed between the write/read control apparatus 3 and the ID device 2.

(6) Other Embodiments

In the above embodiment, the bi-phase code having no DC component is used in order to enable the data represented by the output signal of the PLL decoding circuit to be discriminated irrespective of the change in DC level of this output signal due to the approach of metal material. Therefore, not only the bi-phase code but also other data transmission serial code having no DC component, for example, f/2f code, bipolar code, dicode code, or the like can be used.

Figure 11A:
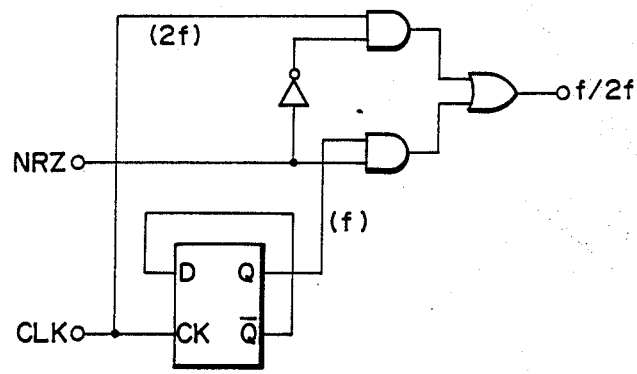
FIG. 11a is a diagram showing an encoding circuit of an f/2f code.
Figure 11B:
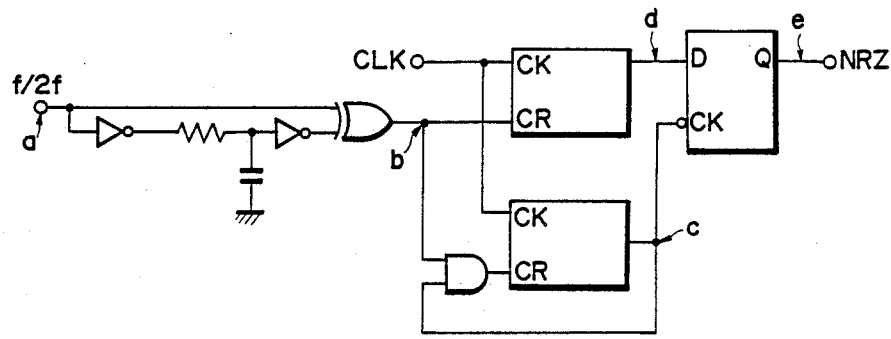
FIG. 11b is a circuit diagram showing an example of a decoding circuit of the f/2f code.
Figure 12:
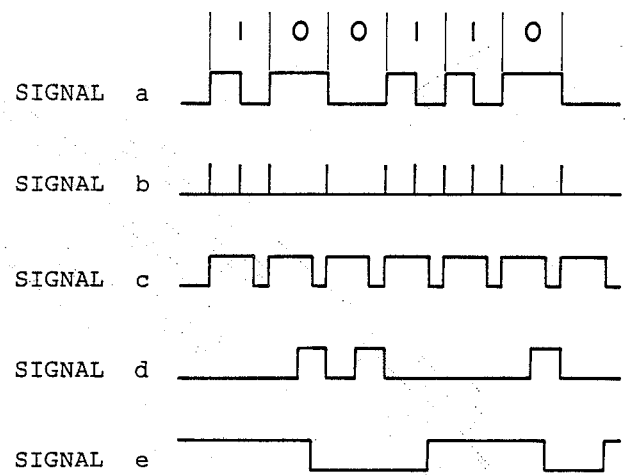
FIG. 12 is a waveform diagram showing waveforms in respective sections in the decoding circuit shown in FIG. 11b.

FIG. 11a is a diagram showing an encoding circuit of an f/2f code. FIG. 11b is a block diagram showing an example of a decoding circuit of the f/2f code. FIG. 12 is a waveform diagram showing waveforms of signals a to e in respective sections in the decoding circuit. As shown in the diagrams, in the f/2f code, a gate circuit is opened or closed in response to sync clocks, thereby forming the codes of f and 2f. By discriminating these codes, the encoded data is obtained. On the other hand, the clocks of the frequency of the f/2f code are extracted and on the basis of these clocks, the decoded signal is obtained.

Figure 13A:
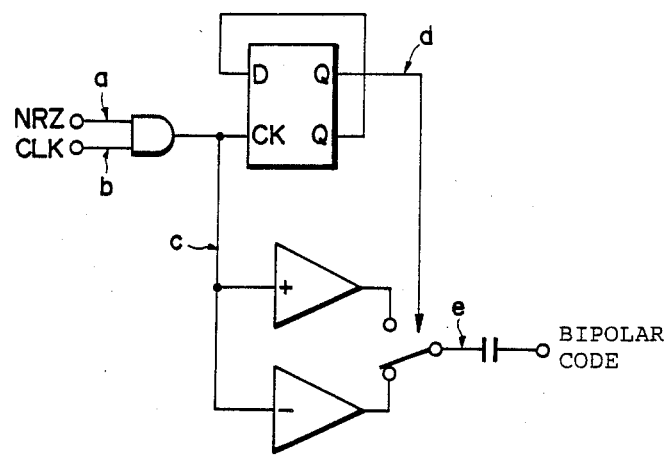
FIG. 13a is a diagram showing an encoding circuit of a bipolar code.
Figure 13B:
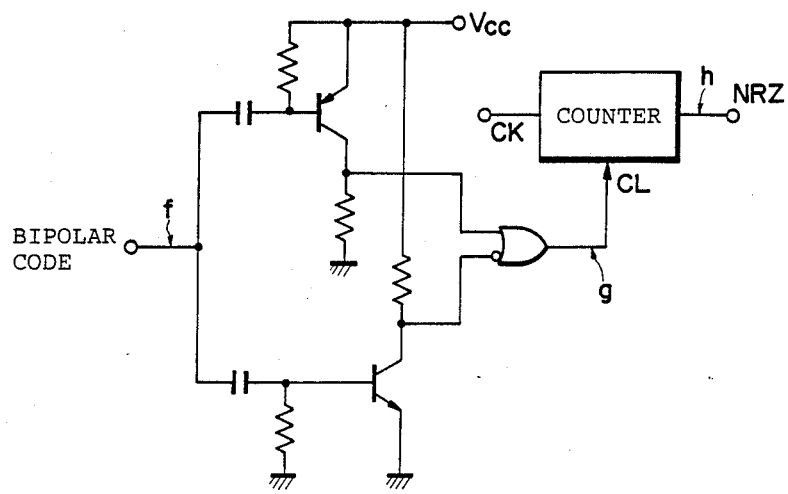
FIG. 13b is a circuit diagram showing a decoding circuit of the bipolar code.
Figure 14:
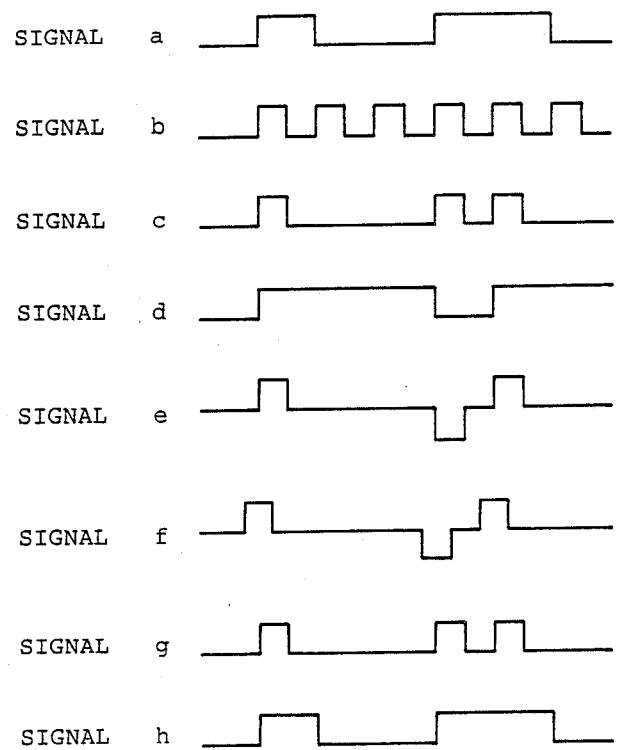
FIG. 14 is a waveform diagram showing waveforms in respective sections in the circuits shown in FIGS. 13a and 13b.

FIGS. 13a and 13b are circuit diagrams showing examples of encoding circuit and decoding circuit of a bipolar code as another data transmission code. FIG. 14 is a waveform diagram showing waveforms of signals a to h in the encoding and decoding circuits of FIGS. 13a and 13b. As shown in the diagrams, in the encoding circuit, the bipolar code is obtained by switching outputs of an inverting amplifier and a non-inverting amplifier in accordance with the content of the data and with the state of the clock signal. In the decoding circuit, the bipolar code is decoded by discriminating the outputs of an inverting amplifier and a non-inverting amplifier.

Figure 16:
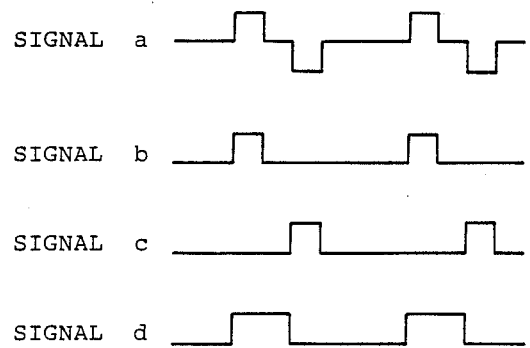
FIG. 16 is a waveform diagram showing waveforms in respective sections in the decoding circuit shown in FIG. 15b.
Figure 15A:
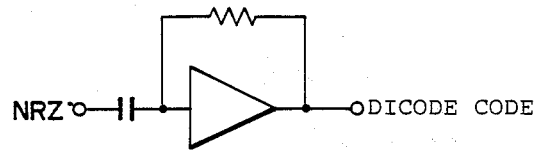
FIG. 15a is a diagram showing an encoding circuit of a dicode code.
Figure 15B:
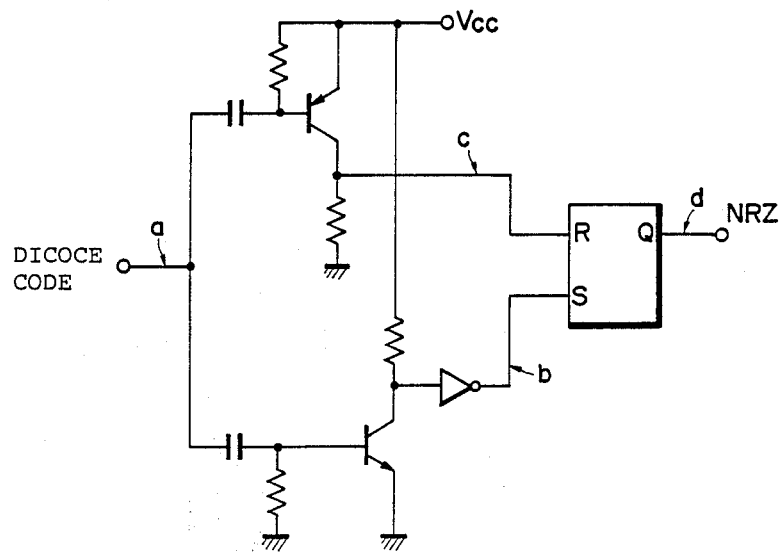
FIG. 15b is a circuit diagram showing a decoding circuit of the dicode code.

Further, FIG. 15a is a diagram showing an encoding circuit of a dicode code. FIG. 15b is a circuit diagram showing an example of a decoding circuit of the dicode code. FIG. 16 is a waveform diagram showing waveforms of signals a to d in respective sections in the decoding circuit of FIG. 15b. As shown in the diagrams, the dicode code can be obtained by differentiating the NRZ code. In the decoding circuit, by discriminating an output by two amplifiers, it is decoded by using the flip-flop.

Further, in this embodiment, the electrically erasable programmable ROM has been used as a memory. However, the invention can also use various kinds of electrically writable and erasable memories such as, e.g., a CMOS type memory which is backed up by a battery and the like.

Figure 17:
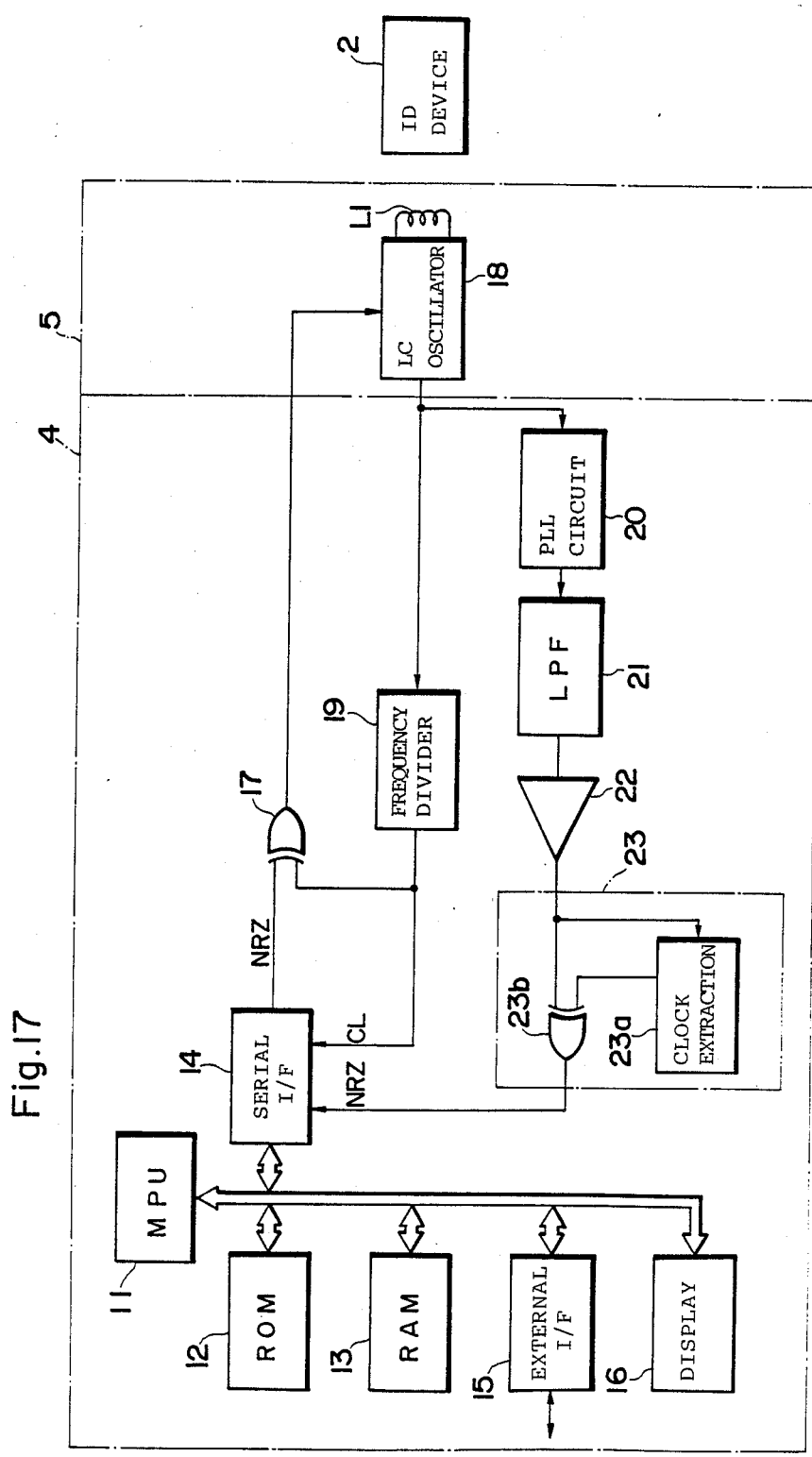
FIGS. 17 and 18 show another embodiment.
Figure 18:
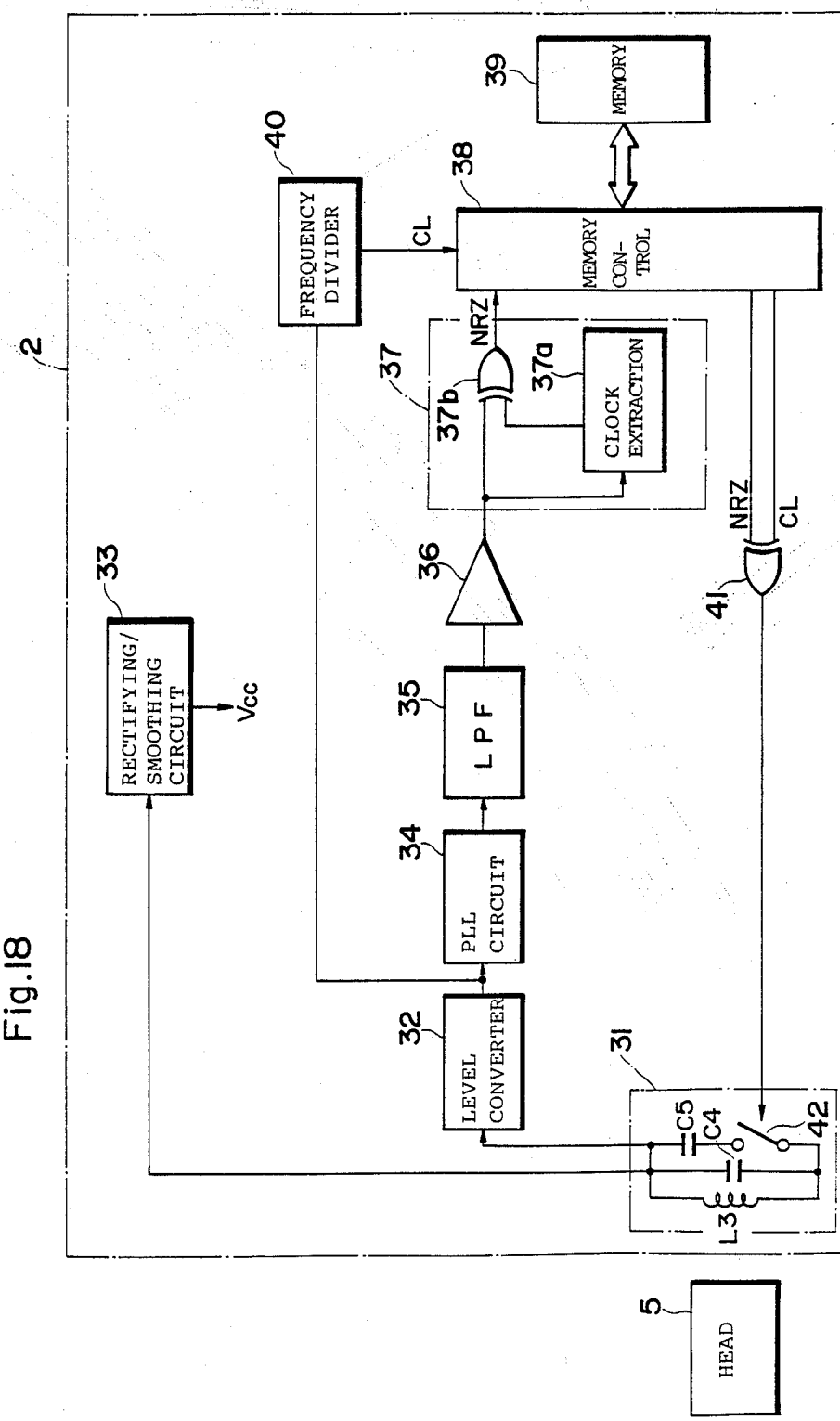

FIGS. 17 and 18 show another embodiment. FIG. 17 shows a constitution of a write/read control apparatus and FIG. 18 shows a constitution of an ID device. In these diagrams, the same and similar parts and component as those shown in FIGS. 2 and 4 are designated by the same reference numerals.

In FIG. 17, the decoding circuit 23 comprises: a clock extracting section 23a to extract clocks; and an exclusive OR circuit 23b which receives a clock signal and a bi-phase code. The input bi-phase code which had been transmitted from the ID device 2 and was demodulated is converted into the NRZ code by the decoding circuit 23. An output of the decoding circuit is given to the MPU 11 through the serial interface 14.

In FIG. 18, a clock signal generated from the frequency divider 40 is supplied from the memory control section 38 to the encoding circuit 41. The decoding circuit 37 has a clock extracting section 37a to extract clocks from an output of the amplifier 36 and an exclusive OR circuit 37b. The bi-phase encoded digital signal which had been transmitted from the write/read control apparatus 3 and was demodulated is converted into the original NRZ digital signal by the decoding circuit 37. This NRZ digital signal is given to the memory control section 38.

In the above embodiments, in order to transmit data from the write/read control apparatus 3 to the ID device 2, the NRZ signal is once converted into the bi-phase code and also when the signal is transmitted from the ID device 2 to the write/read control apparatus 3, the NRZ signal is also similarly converted into the bi-phase code. However, it is also possible to constitute in a manner such that the FSK modulation in the LC oscillator is directly performed using the NRZ code without performing such an encoding conversion and the resonant frequency of the resonance circuit is changed by using the NRZ code, too, thereby enabling the signal to be transmitted.

On the other hand, in the above embodiments, although the electrically erasable programmable ROM has been used as the memory, the invention can also use various kinds of electrically writable and erasable non-volatile memories.

What is claimed is:

1. An article identifying system having an ID device attachable to an article to be identified and a write/read control apparatus to write or read data into or from said ID device, wherein said ID device comprises:
(a) a resonance circuit including a coil;
first data demodulating means for demodulating an output signal of said resonance circuit and obtaining data represented by a change in frequency of said output signal;
(b) an electrically erasable and programmable memory for storing identification data of the article to which said ID device is to be attached;
(c) memory control means for controlling a writing operation of said demodulated data into and reading operation of data from said memory;
(d) data modulating means for changing a resonant frequency of said resonance circuit on the basis of the transmission data which is read out of said memory; and
(e) a rectifying/smoothing circuit for rectifying and smoothing an output from said resonance circuit thereby supplying DC power to each section of said ID device, and said write/read control apparatus comprises:
(f) an oscillator which includes an oscillating coil and discontinuously changes an oscillating frequency in accordance with a data signal to be transmitted to said ID device;
(g) second data demodulating means for demodulating a data signal which is given by the ID device on the basis of a frequency change of a signal obtained from said oscillator; and
(h) data processing means for giving serial data to be transmitted to said oscillator and for converting data given from said second data demodulating means into a parallel signal.

2. A system according to claim 1, wherein said memory is a non-volatile memory.

3. A system according to claim 1, wherein
said ID device further comprises:
first encoding means for encoding the data read out of said memory by said memory control means into transmission code having no DC component and for giving said code to said data modulating means, and
first decoding means for decoding the encoded data signal having no DC component which was demodulated by said first data demodulating means, and said write/read control apparatus further comprises:
second encoding means for encoding the data to be transmitted to said ID device into transmission code having no DC component and for giving said code to said oscillator, and
second decoding means for decoding the encoded data signal having no DC component which was demodulated by said second data demodulating means.

4. A system according to claim 3, wherein the transmission code of said write/read control apparatus and said ID device is a bi-phase code.

5. A system according to claim 3, wherein the transmission code of said write/read control apparatus and said ID device is an f/2f code.

6. A system according to claim 3, wherein the transmission code of said write/read control apparatus and said ID device is a bipolar code.

7. A system according to claim 3, wherein the transmission code of said write/read control apparatus and said ID device is a dicode code.

8. An ID device which is attachable to an article to be identified, comprising:
- a resonance circuit including a coil;
- data demodulating means for demodulating an output signal of said resonance circuit and obtaining data represented by a change in frequency of said output signal;
- an electrically erasable and programmable memory for storing identification data of the article to which said ID device is to be attached;
- memory control means for controlling writing operation of said demodulated data into and reading operation of data from said memory;
- data modulating means for changing a resonant frequency of said resonance circuit on the basis of the transmission data read out of said memory; and
- a rectifying/smoothing circuit for rectifying and smoothing an output from said resonance circuit, thereby supplying DC power to each section in said ID device.

9. An ID device according to claim 8, further having:
- encoding means for encoding the data read out of said memory by said memory control means into a transmission code having no DC component and for giving said code to said data modulating means; and
- decoding means for decoding the encoded data signal having no DC component which was demodulated by said data demodulating means.

10. A write/read control apparatus to write and read data into and from an ID device, said apparatus comprising:
- an oscillator which includes an oscillating coil and discontinuously changes an oscillating frequency in response to a data signal to be transmitted to said ID device;
- data demodulating means for demodulating a data signal which is given from said ID device on the basis of the frequency change of a signal obtained from said oscillator; and
- data processing means for giving serial data to be transmitted to said oscillator, for converting the data given by said data demodulating means into a parallel signal, and for processing said parallel signal.

11. A write/read control apparatus according to claim 10, further having:
- encoding means for converting the data to be transmitted to said ID device into a transmission code having no DC component and for giving said code to said oscillator; and
- decoding means for decoding the encoded data signal having no DC component which was demodulated by said data demodulating means.

12. A method of communicating between an ID device and a write/read control apparatus in an article identification system comprising the steps of:
- receiving at a resonance circuit of the ID device a signal from the write/read control apparatus and rectifying the signal to supply DC power to the ID device;
- demodulating an output of the resonance circuit and obtaining demodulated data by detecting frequency changes in the output of the resonance circuit;
- writing the demodulated data into and reading transmission data from an erasable and programmable memory in response to a memory control means; and
- changing a resonant frequency of the resonance circuit in response to the transmission data.

13. A method of communicating between an ID device and a write/read control apparatus in an article identification system comprising the steps of:
- discontinuously changing an oscillator frequency transmitted by the write/read control apparatus to the ID device to represent a serial data signal to be transmitted to the ID device;
- demodulating a data signal received from the ID device based on a frequency change obtained from an oscillator in the write/read control apparatus;
- converting the data signal received from the ID device from a serial signal to a parallel signal and providing the serial data signal to be transmitted to the oscillator by a data processing means.

14. A method of communicating between an ID device and a write/read control apparatus in an article identification system comprising the steps of:
- receiving at a resonance circuit of the ID device a signal from the write/read control apparatus and rectifying the signal to supply DC power to the ID device;
- demodulating an output of the resonance circuit and obtaining demodulated data by detecting frequency changes in the output of the resonance circuit;
- writing the demodulated data into and reading transmission data from an erasable and programmable memory in response to a memory control means;
- changing a resonant frequency of the resonance circuit in response to the transmission data;
- discontinuously changing an oscillator frequency transmitted by the write/read control apparatus to the ID device to represent a serial data signal to be transmitted to the ID device;
- demodulating a data signal received from the ID device based on a frequency change obtained from an oscillator in the write/read control apparatus; and
- converting the data signal received from the ID device from a serial signal to a parallel signal and providing serial data signal to be transmitted to the oscillator by a data processing means.

* * * * *